Aug. 30, 1932.  G. L. TRENNER ET AL  1,874,836
INDIVIDUAL PIE AND PIE SHELL BAKER
Filed March 28, 1931  2 Sheets-Sheet 1

WITNESSES
Edw. Thorpe
Hugh H. Ott

INVENTORS
G. L. Trenner
N. R. Trenner
BY Munn & Co.
ATTORNEY

Aug. 30, 1932.   G. L. TRENNER ET AL   1,874,836
INDIVIDUAL PIE AND PIE SHELL BAKER
Filed March 28, 1931   2 Sheets-Sheet 2

WITNESSES
Edw. Thorpe

INVENTORS
G. L. Trenner
N. R. Trenner
BY Munn & Co.
ATTORNEY

Patented Aug. 30, 1932

1,874,836

UNITED STATES PATENT OFFICE

GEORGE L. TRENNER AND NELSON R. TRENNER, OF NEW YORK, N. Y.

INDIVIDUAL PIE AND PIE SHELL BAKER

Application filed March 28, 1931. Serial No. 526,058.

This invention relates to the art of pastry baking, and has particular reference to an improved device for the individual baking of pies or pie shells, the same being especially designed for use in small restaurants, tea rooms, homes or the like.

It is the principal object of the present invention to provide means for the individual baking of pies or pie shells, and by virtue of which products a uniformly high grade is insured, both as to the texture of the crust and the cooked quality of the filling.

As a further feature, the invention comprehends a baking device, in which means is afforded for ridding the baking compartment of condensible vapors, to avoid detrimental effects upon the product which would otherwise result from condensation of said vapors within the baking compartment.

The invention further embodies in a device of the indicated character, means for conveying off excess juices from the baking compartment to avoid the burning of the same and the resultant distasteful flavoring of the product thereby, in addition to the dissemination of noxious odors and smoke which might otherwise be emitted from the device.

A further object in view with reference to the baking of pie shells resides in the provision of a device which subjects the shell to the uniform application of heat to the opposite surfaces thereof and to a pressure which eliminates blistering and distortion of the shell.

Other objects of the invention reside in the comparative simplicity of construction and mode of use of the device, the economy with which it may be produced and the general efficiency derived therefrom.

With the above recited and other objects in view, reference is had to the following description and accompanying drawings, in which there are exhibited several examples or embodiments of the invention, while the claims define the actual scope of the same.

Figure 1:
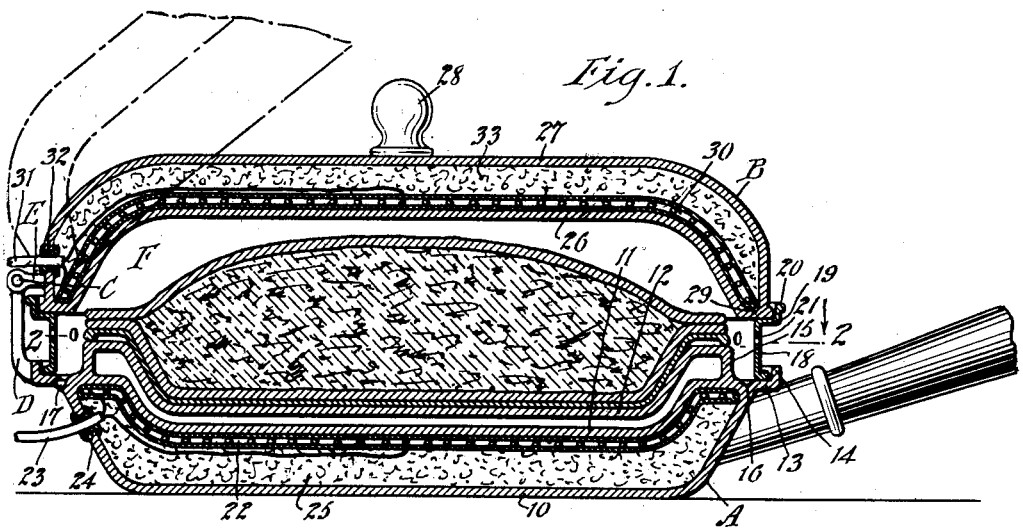
Figure 1 is a vertical sectional view through a pie baking device constructed in accordance with the invention, and illustrating the same in active use.
Figure 2:
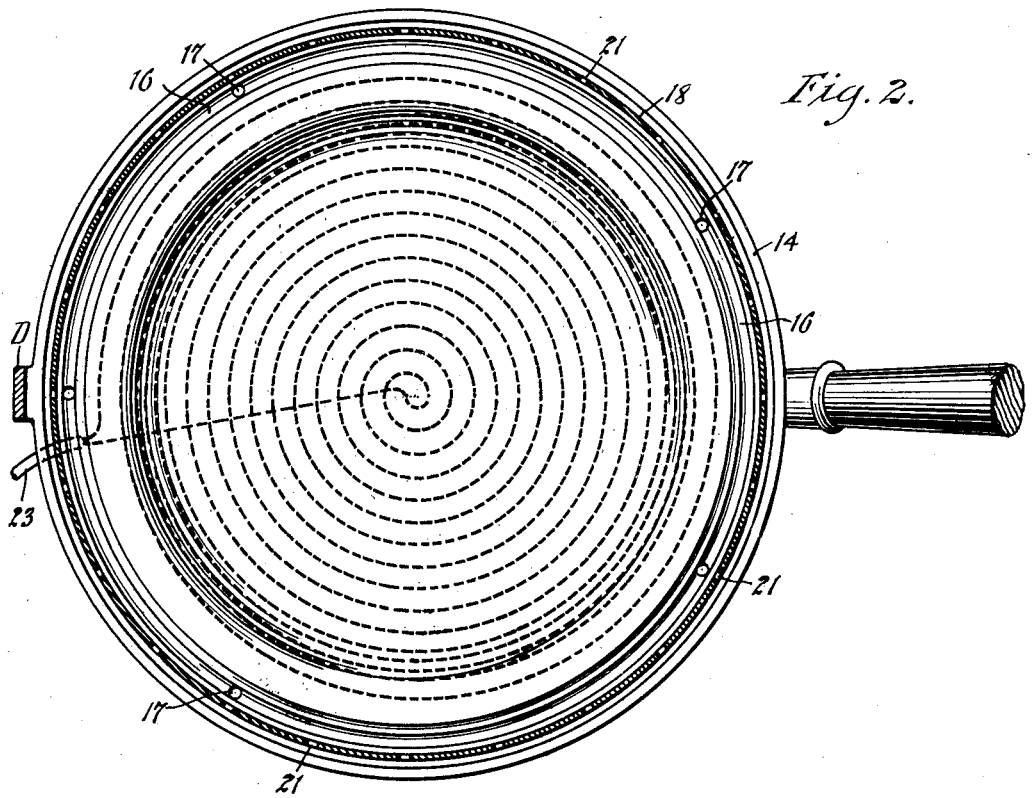
Figure 2 is a sectional plan view therethrough taken approximately on the line indicated at 2—2 in Figure 1.
Figure 3:
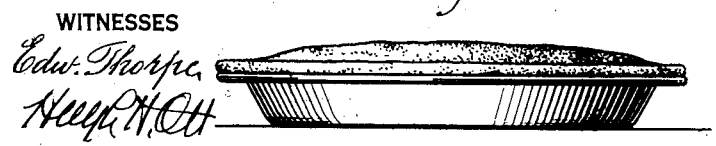
Figure 3 is a side view of the product and its holder removed from the device.

Referring to the drawings by characters of reference, and particularly to the form of the invention illustrated in Figure 1, A designates generally the base section of the device, and B generally the cover section, which are preferably, although not necessarily, hingedly connected by a hinge pin C which loosely extends through the hinge leaves D and E formed respectively on the sections A and B.

The section A is in the form of a hollow shell having a bottom wall 10, an intermediate wall 11 and a top wall 12, said top and intermediate walls being spaced apart and shaped generally to conform to the configuration of a pie plate or tin. The bottom and intermediate walls 10 and 11 at their juncture are formed with an outwardly projecting continuous marginal flange 13 having an upturned marginal terminal or bead 14. This flange together with the depending marginal edge 15 of the upper wall 12 defines a marginal gutter, and the upper surface of the flange 13 is formed with a continuous depression or groove 16, from which groove spaced drain outlets 17 extend downwardly through the flange for the purpose of conveying off excess juices which are exuded from the pie during the baking operation. A separate sleeve or annulus 18 fits at its lower end within the marginal bead 14 and rests upon the flange 13 at a point outside or beyond the groove 16, and said sleeve or annulus 18 is offset outwardly to form a shoulder 19 at its upper end having an upstanding marginal rim. The sleeve or annulus is provided with radial apertures 21 constituting vent openings for the escape of condensible vapors and to avoid the detrimental effects of condensation of the same upon the product. The base section A has arranged therein in close contact with the intermediate wall 11 and between said wall and the bottom wall 10, an electric heating element 22 of any conventional type, to which a conductor 23 leads, said conductor extending through an opening 24 in the base section. The remainder of the space between the walls 10 and 11 is filled with a suitable insulating medium 25 which limits radiation of the heat through the wall 10 and acts to intensify the heat of the intermediate wall 11 and the upper wall 12.

The upper or cover section B is of general dome shape and includes a bottom concavo-convex wall 26 and a spaced similarly shaped top wall 27 which is provided with a central upstanding handle 28. The bottom and top walls 26 and 27 define at their juncture a horizontal bearing portion 29 which is designed to rest upon the shoulder 19 of the sleeve or annulus 18 and to fit within the upstanding rim 20 thereof. An electric heating element 30 is arranged in intimate contact with the inner or upper surface of the bottom wall 26 and is supplied with energy by a conductor 31 which extends through an opening 32 in the section B. The remainder of the space between the walls 26 and 27 of the cover section is filled with an insulating material 33 for a similar purpose to that of the insulating material 25.

With the parts in assembled closed relation as illustrated in Figure 1, the upper and lower sections A and B, together with the sleeve or annulus 18, define a baking compartment F heated from the top and bottom and within which a pie may be arranged and supported for baking. The vent openings 21 obviously permit the steam or condensible vapors to escape, thereby avoiding their condensation within the compartment F and the resultant detrimental effect upon the product. Excess juices exuded from the pie obviously gravitate therefrom onto the flange and into the groove 16, from whence they are conveyed off through the outlet openings 17 and onto a suitable tray or other receptacle within which the device is arranged. After the baking operation, it is obvious that the cover section B may be opened, as shown in the dotted line position, to remove the pie, and the sleeve or annulus may be removed for cleansing purposes. During the baking operation, the heat is uniformly applied to both the upper and lower portions of the pie to insure a uniformly high grade of product, both as to the texture of the crust and the cooked condition of the filling.

Figure 4:
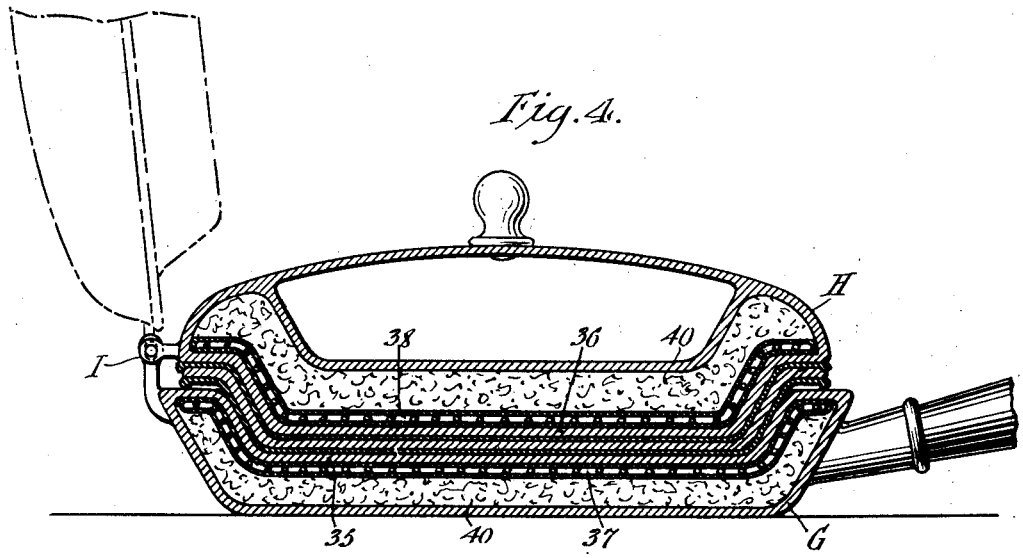
Figure 4 is a vertical sectional view through a modified adaptation of the invention designed particularly for the baking of pie shells.
Figure 5:
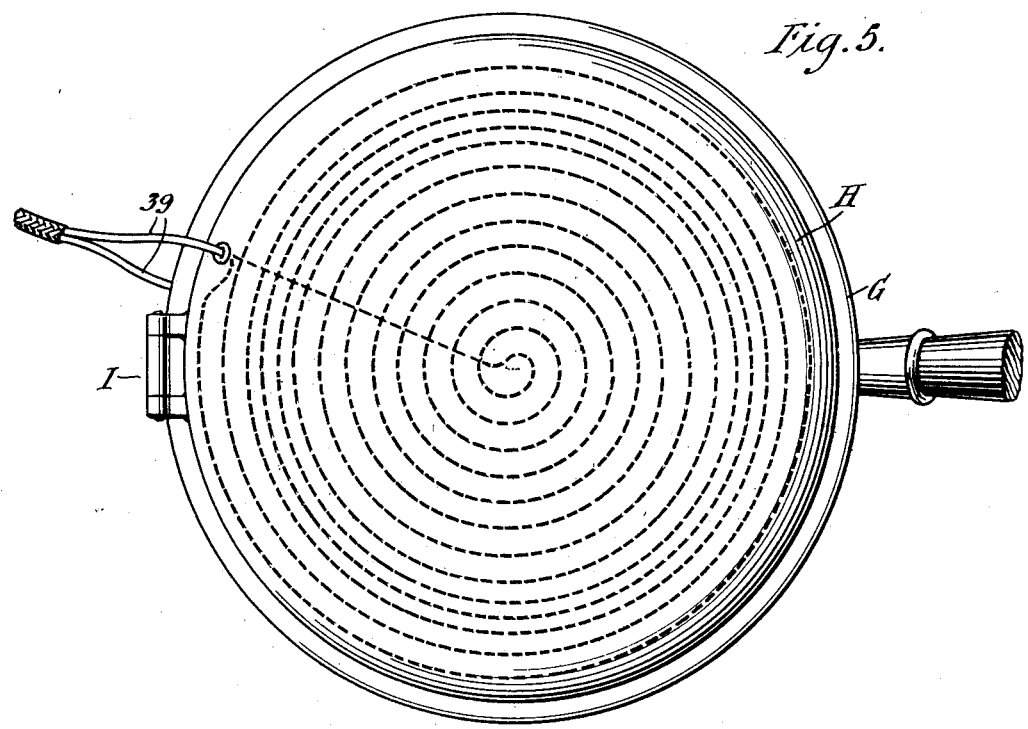
Figure 5 is a plan view thereof.
Figure 6:
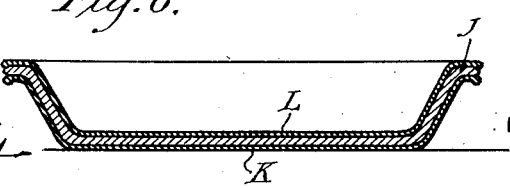
Figure 6 is a sectional view through the shell and the holding means therefor.

In the form of the invention illustrated in Figures 4 and 5, a base or lower section G and a cover or upper section H are employed, which are preferably hingedly connected by a hinge I which is sufficiently loose to permit of a slight relative movement between the sections to compensate for raising or increase in the volume of the product during the baking operation. The form of the device illustrated in Figure 4 is particularly designed for the baking of pie shells or crusts independent of the filling and, as illustrated, the lower or base section G, which is hollow, has its upper wall 35 shaped to conform generally to the configuration of the under side of a pie plate or tin of the conventional type. The cover or upper section H is also of hollow construction and has its lower wall 36 shaped generally to conform to the configuration of the upper surface of a conventional pie plate or tin and to mate or interfit with the wall 35 of the base section to snugly receive therebetween the dough J arranged between a pair of nested pie plates or tins K and L. Within the base section G and intimately fitting the under side of the wall 35, an electric heating element 37 is arranged, while a similar electric heating element 38 is arranged within the upper section H and intimately fitted with the upper surface of the wall 36. Conductors 39 lead respectively to the heating elements 37 and 38 through the walls of the sections G and H. The sections G and H are further filled with insulating material 40 to avoid loss of heat by radiation through the exterior walls and to intensify the heat transmitted by the walls 35 and 36.

In use, the pie shell or crust dough J is arranged between a pair of pie plates or tins K and L, and this assemblage is disposed between the sections G and H, as clearly illustrated in Figure 4, permitting the weight of the upper or cover section H to exert a gravitational pressure during the baking operation. Obviously, due to the uniform application of heat to the upper and lower sides of the dough, a more rapid and thorough baking is obtained which coupled with the pressure makes for a shell of superior quality. It is also apparent that due to the exposure of the marginal edge of the shell during the baking operation, condensible vapors are permitted to escape. The pressure exerted on the shell during the baking operation will positively preclude blistering and insure the production of a shell of attractive appearance, as well as high quality.

What is claimed is:

1. An individual pie baker comprising relatively separable base and cover sections, each carrying an electric heating means and an annulus interposed between said sections having vent openings for the escape of condensible vapors, the said base section having a central supporting portion and an outwardly projecting continuous marginal flange having a drain depression and formed with spaced drain outlets extending downwardly therefrom to convey off the excess juices exuded from the pie during the baking operation.

2. In an individual pie baking device, a base containing electric heating means, a central pie supporting portion, a continuous marginal flange disposed in a plane below the outer edge of said central portion, said flange having a continuous groove and spaced outlets communicating therewith and extending downwardly therefrom through the flange, an upstanding perforate annulus on said flange disposed outside of said groove and a cover section containing electric heating means supported by the upper end of said annulus and defining together with said annulus and the lower section, a pie baking compartment.

3. In an individual pie baking device, a base containing electric heating means, a central pie supporting portion, a continuous marginal flange disposed in a plane below the outer edge of said central portion, said flange having a continuous groove and spaced outlets communicating therewith and extending downwardly therefrom through the flange, an upstanding perforate annulus removably mounted on said flange disposed outside of said groove and a cover section containing electric heating means supported by the upper end of said annulus and defining together with said annulus and the lower section, a pie baking compartment.

Signed at New York in the county of New York and State of New York this 25th day of March, 1931 A. D.

GEORGE L. TRENNER.
NELSON R. TRENNER.